United States Patent [19]

Ive

[11] 4,400,810
[45] Aug. 23, 1983

[54] PROCESSING BINARY DATA

[75] Inventor: John G. S. Ive, London, England

[73] Assignee: Sony Corporation, Tokyo, Japan

[21] Appl. No.: 257,393

[22] Filed: Apr. 24, 1981

[30] Foreign Application Priority Data

May 1, 1980 [GB] United Kingdom ............... 8014487

[51] Int. Cl.$^3$ .............................................. G06F 11/10
[52] U.S. Cl. ..................................... 371/40; 360/38.1; 371/38
[58] Field of Search ...................... 371/38, 40; 360/32, 360/38.1

[56] References Cited

U.S. PATENT DOCUMENTS

| | | | |
|---|---|---|---|
| 3,195,107 | 7/1965 | Rudolph | 371/52 |
| 4,145,683 | 3/1979 | Brookhart | 371/38 |
| 4,211,997 | 7/1980 | Rudnick et al. | 371/40 |
| 4,238,852 | 12/1980 | Iga et al. | 371/40 |
| 4,281,355 | 7/1981 | Wada et al. | 371/38 |
| 4,306,305 | 12/1981 | Doi et al. | 371/38 |
| 4,356,564 | 10/1982 | Doi et al. | 371/40 |

Primary Examiner—Charles E. Atkinson
Attorney, Agent, or Firm—Lewis H. Eslinger; Alvin Sinderbrand

[57] ABSTRACT

A method of processing binary data, which is preferably a digital television signal, comprises dividing the data into blocks of ten 8-bit words, deriving an 8-bit parity word each digit of which is a parity digit for the corresponding digits of the ten words, deriving an 8-bit check word by binary summing the ten words and forming the check word as the eight least significant bits of the resulting binary sum, subjecting to further processing, for example by magnetic recording and reproduction, the block of words including the parity word and the check word, and thereafter checking the parity word and the check word to reveal errors occuring in the ten words during the further processing.

14 Claims, 8 Drawing Figures

FIG. 1A
FIG. 1B
FIG. 1C

|  | DATA WORDS | | | | | | | | | | PARITY WORD P | CHECK WORD C |
|---|---|---|---|---|---|---|---|---|---|---|---|---|
| BIT | $W_1$ | $W_2$ | $W_3$ | $W_4$ | $W_5$ | $W_6$ | $W_7$ | $W_8$ | $W_9$ | $W_{10}$ | | |
| 1 | $D_{11}$ | $D_{21}$ | $D_{31}$ | $D_{41}$ | $D_{51}$ | $D_{61}$ | $D_{71}$ | $D_{81}$ | $D_{91}$ | $D_{10,1}$ | $P_1$ | $C_1$ |
| 2 | $D_{12}$ | $D_{22}$ | $D_{32}$ | $D_{42}$ | $D_{52}$ | $D_{62}$ | $D_{72}$ | $D_{82}$ | $D_{92}$ | $D_{10,2}$ | $P_2$ | $C_2$ |
| 3 | $D_{13}$ | $D_{23}$ | $D_{33}$ | $D_{43}$ | $D_{53}$ | $D_{63}$ | $D_{73}$ | $D_{83}$ | $D_{93}$ | $D_{10,3}$ | $P_3$ | $C_3$ |
| 4 | $D_{14}$ | $D_{24}$ | $D_{34}$ | $D_{44}$ | $D_{54}$ | $D_{64}$ | $D_{74}$ | $D_{84}$ | $D_{94}$ | $D_{10,4}$ | $P_4$ | $C_4$ |
| 5 | $D_{15}$ | $D_{25}$ | $D_{35}$ | $D_{45}$ | $D_{55}$ | $D_{65}$ | $D_{75}$ | $D_{85}$ | $D_{95}$ | $D_{10,5}$ | $P_5$ | $C_5$ |
| 6 | $D_{16}$ | $D_{26}$ | $D_{36}$ | $D_{46}$ | $D_{56}$ | $D_{66}$ | $D_{76}$ | $D_{86}$ | $D_{96}$ | $D_{10,6}$ | $P_6$ | $C_6$ |
| 7 | $D_{17}$ | $D_{27}$ | $D_{37}$ | $D_{47}$ | $D_{57}$ | $D_{67}$ | $D_{77}$ | $D_{87}$ | $D_{97}$ | $D_{10,7}$ | $P_7$ | $C_7$ |
| 8 | $D_{18}$ | $D_{28}$ | $D_{38}$ | $D_{48}$ | $D_{58}$ | $D_{68}$ | $D_{78}$ | $D_{88}$ | $D_{98}$ | $D_{10,8}$ | $P_8$ | $C_8$ |

FIG. 2

PROCESSING BINARY DATA

BACKGROUND OF THE INVENTION

1. Field of the Invention

This invention relates to methods of and apparatuses for processing binary data, in particular, but not exclusively, for the purpose of detecting and in some cases correcting errors in digital television signals.

2. Description of the Prior Art

There are two main approaches to dealing with errors in digital television signals. The first approach is correction, which involves the production and use of additional data signals purely for the purposes of error detection and correction, these additional data signals otherwise being redundant. The present invention is primarily concerned with correction and in particular with providing effective correction without the need for an excessive amount of additional data which might overload the data handling paths or raise the data rate to an unacceptable level. The second approach, with which the present invention is also to some extent concerned, is concealment. This is a process of particular application to digital television signals, and comprises the reconstruction of corrupted data signals using available uncorrupted data signals and relying for accuracy on the strong correlation that exists in a television signal.

SUMMARY OF THE INVENTION

One object of the present invention is to provide an improved method of and apparatus for detecting and in some case correcting errors in binary data.

Another object of the present invention is to provide a method of processing binary data by dividing the data into blocks and forming parity words and check words for the detection and correction of at least some errors in the words in each block.

Another object of the present invention is to provide apparatus which can be used in association with a video tape recorder to effect detection and correction of at least some of the errors which may occur when a digital television signal is recorded and subsequently reproduced.

According to the present invention there is provided a method of processing binary data comprising dividing the data into blocks of m words each of n bits, deriving an n-bit parity word each digit of which is a parity digit for the corresponding digits of said m words, deriving an n-bit check word by binary summing said m words and forming said check word as the n least significant bits of the resulting binary sum, subjecting to further processing said block of words including said parity word and said check word, and thereafter using said parity word and said check word to reveal and correct at least some of the errors occurring in said m words during said further processing.

Preferably n is 8 and prior to said further processing, said words are all converted to respective 10-bit words using the sub-set of 10-bit words consisting of five "0" bits and five "1" bits, said 10-bit words being re-converted to 8-bit words after said further processing. Preferably, also, the natural sequence of said words is shuffled prior to said further processing, and the order is restored to said natural sequence after said further processing.

The data may represent video information of a television signal in digital form, and said further processing may comprise magnetic recording and reproduction.

According to the present invention there is also provided apparatus for processing binary data, the apparatus comprising means for dividing the data into blocks of m words each of n bits, means for deriving an n-bit parity word each digit of which is a parity digit for the corresponding digits of said m words, means for deriving an n-bit check word by binary summing said m words and forming said check word as the n least significant bits of the resulting binary sum, means to subject said block of words including said parity word and said check word to further processing, and means for thereafter using said parity word and said check word to reveal and correct at least some of the errors occuring in said m words during said further processing.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1A, 1B and 1C represent sequences of data words;

FIG. 2 represents a block of data words;

DESCRIPTION OF THE PREFERRED EMBODIMENTS

Figure 3:
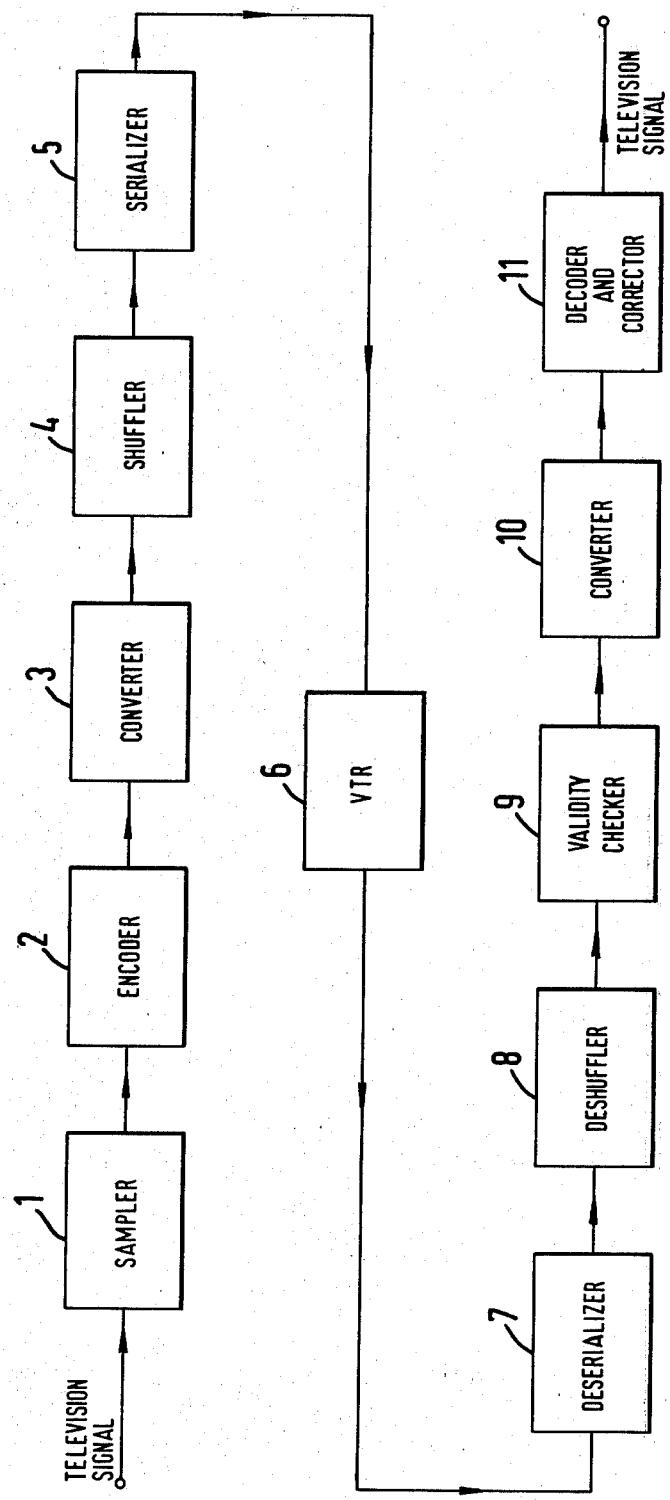
FIG. 3 is a block diagram of an embodiment of apparatus according to the invention.

Before describing the embodiment, a previously proposed approach to error protection in a digital video signal will be considered. Such an approach has been used in association with a digital video tape recorder wherein the actual video information of a television signal, that is to say the television signal less the vertical and horizontal synchronizing signals and the burst signals, is recorded in digital form by sampling the video information and coding the sampled values so obtained into multi-bit words for serial recording. For satisfactory reproduction of the recorded video information some 512 samples per horizontal line scan and some 256 different sample values are required, which would mean that each sample value could be represented by an 8-bit word. For several reasons, however, 10-bit words are in fact used.

Firstly, this is because the use of all 256 possible 8-bit words would involve the use of pulse groups, such as those representing the words consisting of eight successive "0" bits or eight successive "1" bits, which cannot be satisfactorily magnetically recorded and reproduced because of the lack of transients. Secondly, use of all 256 8-bit words offers no reasonable possibility of detecting or correcting errors. It should be noted that even a single-bit error in the reproduced serial data will, on re-conversion of the reproduced serial data to parallel form, result in a word error which can result in severe perturbation of the reproduced television picture.

In view of these problems it has been proposed to use 10-bit words, and in particular the sub-set of 252 10-bit words, out of the full set of 1024 10-bit words, which consist of five "0" bits and five "1" bits. For practical purposes the 252 words available in this sub-set are close enough in number to the 256 theoretically required for sample purposes. The use of these particular words gives sufficient transients in each word for satisfactory magnetic recording and reproduction and permits clock recovery on reproduction.

On reproduction, each word is checked to determine whether it is a valid member of the sub-set. If not, then clearly there is an error. However, it will be appreciated that there is an approximately 25% chance that any error in a valid word will result in another valid, although erroneous, word. In other words, the chances of detecting an error are only approximately 75%. In practice, single-word errors are rare, and burst errors which are due to drop-out and which corrupt many words are more likely. To deal with this, one possibility is to assume that the two words preceding and the two words following a word found to be invalid are also in error, and to conceal these errors by replacing by estimates all the words deemed to be in error. This technique can detect up to approximately 98% of all errors, but this is still not sufficient to avoid occasional severe perturbation of a reproduced television picture. Moreover, even where errors are detected, satisfactory concealment is not always possible, in particular because the quality of an estimate formed whether by simple averaging or by the use of an algorithm is dependent on the number and proximity of adjacent error-free words, and the automatic elimination of a block of five words every time an error is detected reduces the number of error-free words available for forming such estimates.

Figures 1A, 1B, 1C:
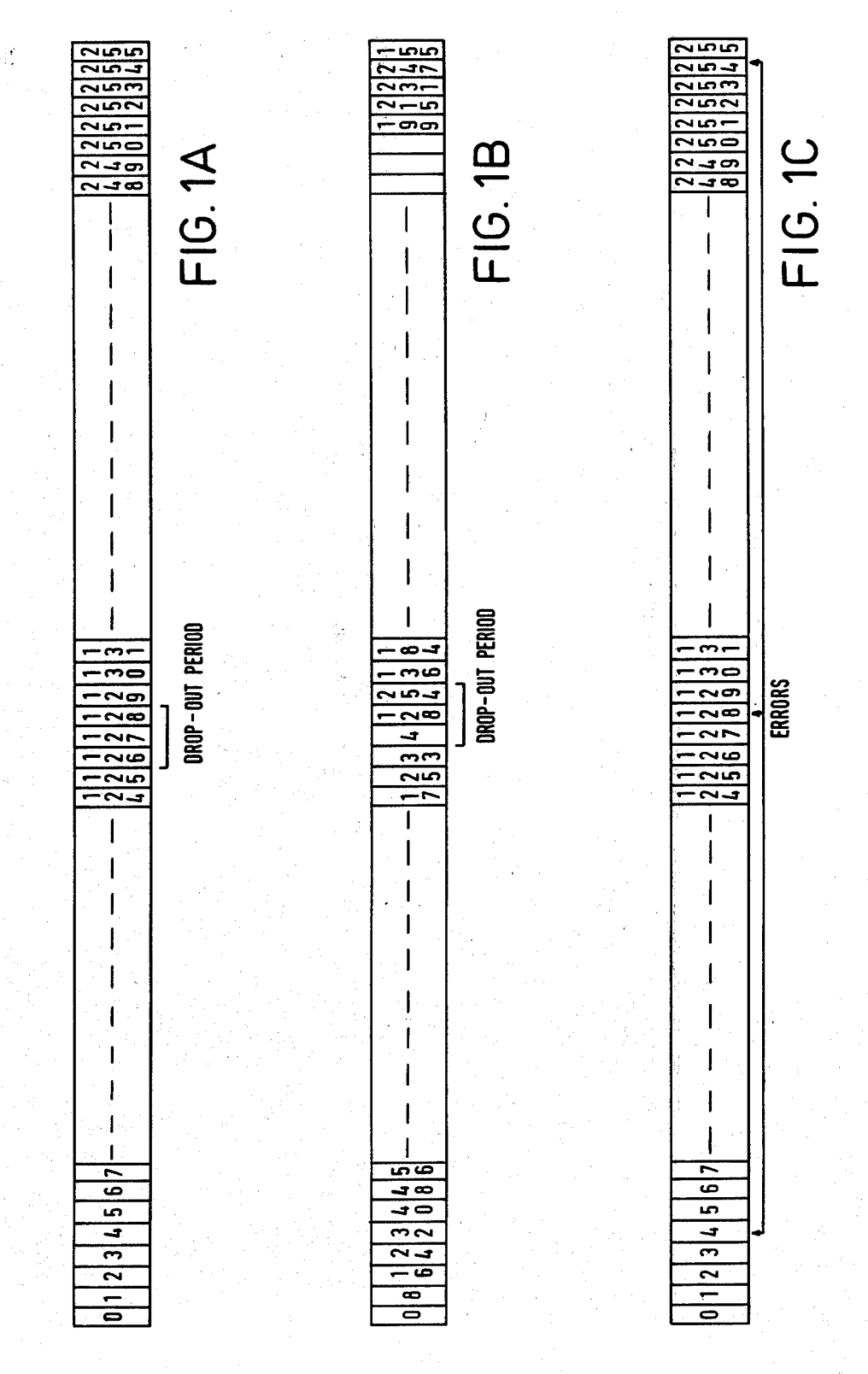

A technique for alleviating this problem is illustrated in FIGS. 1A to 1C. If each half of a horizontal line scan of a video signal is sampled 256 times to form 256 parallel data words, then the natural sequence of these words is as shown in FIG. 1A. A three-word drop-out period may affect say words 126, 127 and 128, and for the reasons given above satisfactory concealment of the resulting errors will be difficult due to the lack of adjacent error-free words for use in forming estimates. However, if the 256 words are shuffled in order prior to recording, then the reproduced shuffled sequence of parallel data words may be shown in FIG. 1B. In this case a three-word drop-out period may affect say words 4, 128 and 254, and when the reproduced shuffled sequence is restored to the natural sequence these error words are widely dispersed, as illustrated in FIG. 1C. More satisfactory concealment of the errors using adjacent error-free words is therefore possible.

The embodiment to be described can detect the presence of error words within a block of m words and if only one error word exists it can be corrected. Errors in excess of one word may require the whole block to be concealed. However, as already indicated, errors will normally occur due to drop-out in bursts of consecutive words, but infrequently. By shuffling the word sequence before recording and restoring the sequence after reproduction, as described above, such errors can be distributed, usually such that only one error word appears in each block. Correction therefore becomes possible up to some predetermined drop-out period length, after which concealment becomes necessary.

In the embodiment, each half of each horizontal line scan of a television signal is sampled at 256 successive points and the sample values so obtained are coded to form respective 8-bit parallel data words. The words so obtained are divided into blocks of ten successive words. Such a block of words is shown in FIG. 2, the words occurring in sequence but with the bits of each word in parallel. The words are numbered $W_1$ to $W_{10}$ and the notation $D_{32}$, for example, represents the second bit in the third word $W_3$.

The embodiment is shown in block form in FIG. 3. The incoming television signal is supplied to a sampling arrangement 1 which derives the sample values and codes them to form the respective 8-bit parallel data words, which are supplied in blocks of ten data words $W_1$ to $W_{10}$ to a data encoder 2.

The data encoder 2, which is described in more detail below, derives from the block of ten data words $W_1$ to $W_{10}$, two additional 8-bit parallel words. The first additional word is a parity word P made up of 8-bits $P_1$ to $P_8$ (FIG. 2), each of which bits $P_n$ is derived using the relation:

$$P_n = D_{1n} \oplus D_{2n} \ldots \oplus D_{8n}$$

where $\oplus$ indicates modulo-two addition. Odd or even parity can be used. The second additional word is a check word C, the 8-bit binary value of which is derived by forming the sum:

$$C = \Sigma(W_1, W_2 \ldots W_{10})$$

where $W_n$ in this relation represents the binary value of the nth word of the block of ten data words. That is, the check word C is the eight least significant bits of the binary summation of the ten data words in the block.

The block of ten data words $W_1$ to $W_{10}$ has therefore become a block of twelve 8-bit parallel data words $W_1$ to $W_{10}$PC, the individual words of which are then converted by a converter 3 to respective 10-bit parallel data words using the sub-set of words consisting of five "0" bits and five "1" bits referred to above. The sequence of words is then shuffled as described above by a shuffler 4 in which the words are stored in and then read from an array of word stores under the control of a programmable read-only memory. The resulting 10-bit words are then converted to serial form in a serializer 5 and, for example, magnetically recorded using a digital video tape recorder 6.

On subsequent reproduction from the video tape recorder 6, the data is first re-converted back to parallel form in a deserializer 7 and then restored to the natural sequence in a deshuffler 8 under control of the same or an identical programmable read-only memory as used for the shuffling process. The resulting 10-bit parallel data words are then checked individually in a validity checker 9 to see if they are valid members of the sub-set before reconversion in a converter 10 back to the corresponding 8-bit parallel data words. If an invalid word is detected, then it is necessary to consider the relation of that word to the block of words in which it occurs. If the invalid word is the parity word P or the check word C, or if two or more invalid words occur in the same block of words, which possibility is made unlikely by the shuffling process, then the whole block must be concealed; that is to say all the data words $W_1$ to $W_{10}$ in the block must be replaced by estimated values. If, however, there is only one invalid word in the block, and that word is not the parity word P or the check word C, then that word can be corrected bit by bit using the parity word P. The ten words $W_1$ to $W_{10}$ in the block can then be checked by binary summation and comparison of the eight least significant bits of the resulting sum with the check word C.

As previously indicated, it is possible for errors to occur whereby words which are valid members of the sub-set are changed into error words which are also valid members of the sub-set. To detect such errors the parity check and summation check are therefore carried out for every block of reproduced data words even if the initial check does not reveal any invalid words. If the block contains only one error word, then the parity check will reveal that there is an error, but as it will not indicate which word is in error the whole block must be concealed. If the block contains more than one error word then the parity check may not reveal this, but the summation check will almost certainly do so. Again, however, the check will not indicate which words are in error, so the whole block must be concealed. These latter operations are performed in a decoder and corrector 11 described in more detail below.

Thus the method described will, in association with the statistics of likely errors, correct the majority of errors and provide a very high detection probability.

Figure 4:
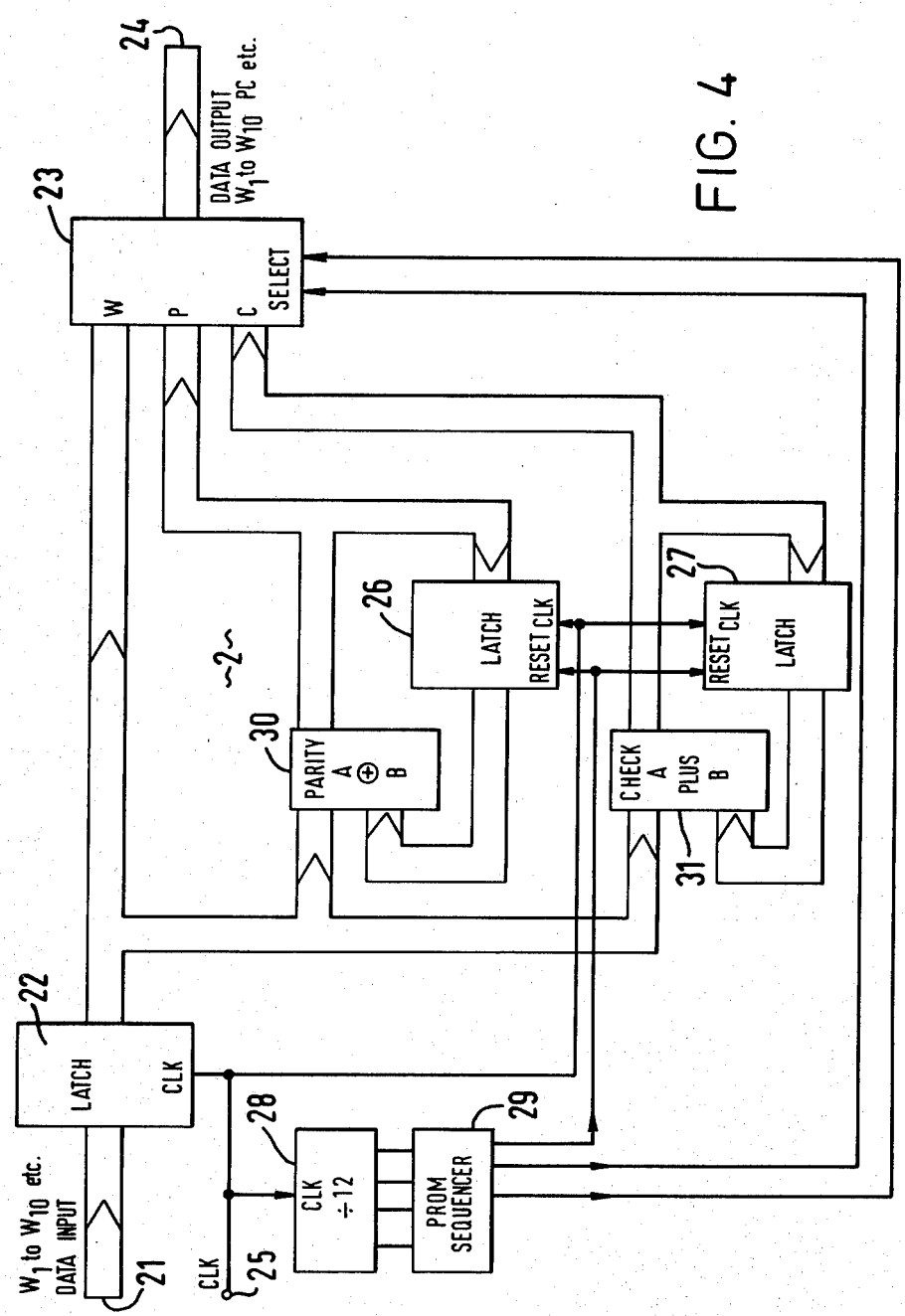
FIG. 4 is a block diagram of a data encoder forming part of the apparatus of FIG. 3.

FIG. 4 shows a block diagram of the data encoder 2 of FIG. 3 for forming the parity word P and the check word C referred to above for each block of data words $W_1$ to $W_{10}$. The data encoder 2 comprises a data input 21 by way of which the data in the form of successive blocks of ten data words $W_1$, $W_2$, $W_3$, $W_4$, $W_5$, $W_6$, $W_7$, $W_8$, $W_9$, $W_{10}$, $W_1$, $W_2$, ... is supplied to a latch circuit 22, the output of which is connected to a data word input of a word storing and selecting circuit 23, the output of which is connected to a data output 24.

The data encoder 2 also includes a clock input terminal 25 to which a clock pulse signal the repetition rate of which is equal to the input word rate is supplied. The clock input terminal 25 is connected to the clock terminal of the latch circuit 22, to the clock terminals of latch circuits 26 and 27 and to the clock terminal of a frequency divider 28. The frequency divider 28 divides the clock pulse signal by twelve and provides outputs to a programmed read-only memory sequencer 29 which has three outputs. Division by twelve brings the repetition rate of the clock pulse signal down to the repetition rate of the blocks of twelve words in the output data, each such block comprising a block of ten data words $W_1$ to $W_{10}$, the parity word P and the check word C. The first and second outputs of the sequencer 9 are connected to respective selection terminals of the word storing and selecting circuit 23, while the third output is connected to reset terminals of the latch circuits 26 and 27.

The output of the latch circuit 22 is also connected to one input of a parity word forming circuit 30 the output of which is connected to a parity word input of the word storing and selecting circuit 23 and also to the input of the latch circuit 26, the output of which is connected to a second input of the parity word forming circuit 30. The parity word forming circuit 30 performs an exclusive-OR operation $A \oplus B$.

The output of the latch circuit 22 is also connected to one input of a check word forming circuit 31, the output of which is connected to a check word input of the word storing and selecting circuit 23 and also to the input of the latch circuit 27, the output of which is connected to a second input of the check word forming circuit 31. The check word forming circuit 31 performs a full addition operation $A+B$, but only retains the eight least significant bits of each summation, any carry resulting in a ninth bit being disregarded.

The operation of the data encoder 2 will now be described, and it will be appreciated that in FIG. 4, and also in FIGS. 5 and 6 the paths shown by double lines represent paths over which data is passing in 8-bit parallel form.

As previously mentioned, the input data comprises a sequence of successive blocks of ten data words $W_1$ to $W_{10}$, these words being extracted word-by-word by the latch circuit 22 so as then to be passed word-by-word under control of the clock signal to the word input of the word storing and selecting circuit 23, and respective inputs of the parity word forming circuit 30 and the check word forming circuit 31. If it is assumed that the latch circuits 26 and 27 have been reset at the end of an incoming block of ten data words $W_1$ to $W_{10}$, that is to say subsequent to the tenth data word $W_{10}$ of the block, then the operation of forming a parity word P and a check word C re-starts with the arrival of the first word $W_1$ of the next block of ten data words $W_1$ to $W_{10}$.

The parity word forming circuit 30 holds the first data word $W_1$, until the arrival of the second data word $W_2$, whereupon the exclusive-OR operation is performed and the output is supplied to the word storing and selecting circuit 23 and also to the latch circuit 26, which supplies an output back to the parity word forming circuit 30 for the next exclusive-OR operation on arrival of the next data word $W_3$. This continues until the parity word P has been derived making use of the whole block of ten data words $W_1$ to $W_{10}$.

In a generally similar way the check word forming circuit 31 operates to sum the data words $W_1$ to $W_{10}$, disregarding any carry bit beyond the eight least significant bits.

The word storing and selecting circuit 23 derives and supplies the required sequence of output data by passing a block of ten data words $W_1$ to $W_{10}$, followed, under control of signals supplied by the sequencer 29, by the parity word P and the clock word C. The timings of the signals supplied by the sequencer 29 are such that the parity word P is that supplied by the parity word forming circuit 30 on receipt of the tenth data word $W_{10}$ of the block, and likewise the check word C used is that supplied by the check word forming circuit 31 on receipt of the tenth data word $W_{10}$ of the block. Thus, the data encoder 2 operates to derive the required parity words P and check words C and interpose them in the appropriate positions in the sequence of data words, so that the output data comprises a sequence of words $W_1$, $W_2$, $W_3$, $W_4$, $W_5$, $W_6$, $W_7$, $W_8$, $W_9$, $W_{10}$, P, C, $W_1$, $W_2$, ... for supply to the converter 3 (FIG. 3).

Figure 5:
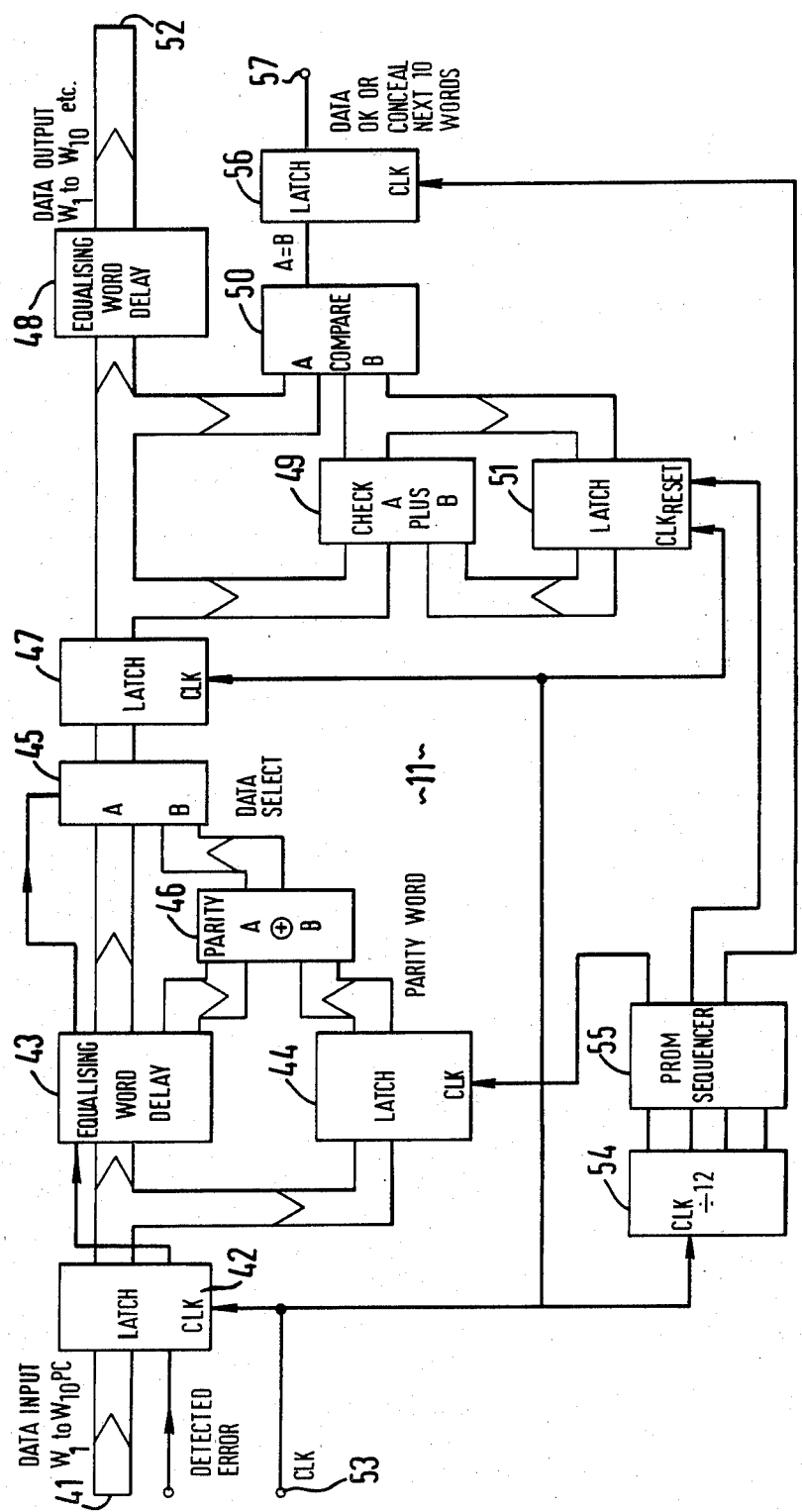
FIG. 5 is a block diagram of a data decoder and corrector forming part of the apparatus of FIG. 3.

FIG. 5 shows a block diagram of the decoder and corrector 11 of FIG. 3 for checking and in some cases correcting the input data which comprises a sequence of words $W_1$, $W_2$, $W_3$, $W_4$, $W_5$, $W_6$, $W_7$, $W_8$, $W_9$, $W_{10}$, P, C, $W_1$, $W_2$, .... The decoder and corrector 11 comprises a data input 41 by means of which the input data is supplied to a latch circuit 42, the output of which is connected to an equalizing word delay circuit 43 and a latch circuit 44. The equalizing word delay circuit 43 has a first output connected to a data selection circuit 45 and a second output connected to a first output of a parity check circuit 46. The output of the latch circuit 44 is connected to a second input of the parity check circuit 46, the output of which is connected to a second input of the data selection circuit 45.

The output of the data selection circuit 45 is connected to a latch circuit 47, the output of which is connected an equalizing word delay circuit 48, one input of a summation circuit 49, and one input of a comparator circuit 50. The output of the summation circuit 49 is connected to a second input of the comparator circuit 50 and also to the input of a latch circuit 51, the output of which is connected to a second input of the summation circuit 49. The output of the equalizing word delay circuit 48 is connected to a data output 52 at which is developed a sequence of the at least partly corrected blocks of data words $W_1$ to $W_{10}$.

The decoder and corrector 11 also includes a clock input terminal 53 to which a clock pulse signal the repetition rate of which is equal to the incoming word rate is supplied. The clock input terminal 53 is connected to clock terminals of the latch circuits 42, 47 and 51, and also to the clock terminal of a frequency divider 54. The frequency divider 54 divides the clock pulse signal by twelve and provides outputs to a programmed read-only memory sequencer 55 which has three outputs. Division by twelve brings the repetition rate of the clock pulse signal down to the repetition rate of the blocks of twelve words in the input data or of ten words in the output data. The first output of the sequence 55 is connected to a clock terminal of the latch circuit 44, the second output is connected to a reset terminal of the latch circuit 51, and the third output is connected to a clock terminal of a latch circuit 56. The comparator circuit 50 supplies an output signal to the input of the latch circuit 56 when the two words supplied to the comparator circuit 50 are identical, and the latch circuit 56 supplies an output signal to an output terminal 57 indicating either that the output data supplied to the data output 52 is correct, or that it is necessary to conceal the next group of data words $W_1$ to $W_{10}$.

The decoder and corrector 11 also has an error signal input terminal 58 to which a signal is supplied by the validity checker 9 (FIG. 3) if an invalid word is detected. Any such error signals are supplied from the error signal input terminal 58 to the latch circuit 42, and thence to the first equalizing word delay circuit 43 and the data selection circuit 45.

The operation of the decoder and corrector 11 will now be described.

If the validity checker 9 (FIG. 3) detects an invalid word, then an error word signal is supplied to the error signal input terminal 53. If the invalid word is the parity word P or the check word C, or if two or more invalid words occur in the same block of data words, then the whole block of ten data words $W_1$ to $W_{10}$ must be concealed, and the signal supplied to the output terminal 57 must signify this. If there is only one invalid word and this is not the parity word P or the check word C, then the latch circuit 44 extracts the parity word P and the parity word checker 46 corrects the invalid word bit-by-bit using the parity word P. The corrected word is then substituted in the block of data words by the data selection circuit 45. If there are two or more error words in the block of data words the parity word checker 46 will attempt to correct them, but the result will be erroneous.

Additionally, after the parity check, a summation check is carried out for every block of reproduced data words, even if the validity checker 9 (FIG. 3) does not reveal any invalid words. If the block contains only one error word, then the parity check circuit 46 will reveal that there is an error, but it will not indicate which word is in error so the whole block of data words $W_1$ to $W_{10}$ must be concealed. If the block contains more than one error word, then the parity check circuit 46 will have applied erroneous correction, but the summation effected by the summation circuit 49 and the latch circuit 51 will give rise to a different check word C from that derived from the original summation. These two check words C will be supplied to the comparator circuit 50, and the negative result of the comparison will result in a signal being supplied by way of the latch circuit 56 to the output terminal 57 signifying that the block of data words $W_1$ to $W_{10}$ must be concealed.

Up to now it has been assumed that if the validity checker 9 (FIG. 3) detects an invalid word, and that invalid word happens to be the parity word P or the check word C, the whole block of ten data words $W_1$ to $W_{10}$ must be concealed. In fact, however, this may result in unnecessary concealment, because it may be that only the parity word P or the check word C is invalid. Indeed the probability of this being so is quite high, in particular because the shuffling and de-shuffling process described above tends to make single-word errors in a block of data words fairly likely.

To stop such unnecessary concealment, therefore, the apparatus of FIG. 3 may be modified to include an additional checking means. Briefly, a check is made that all the data words of the block of ten data words $W_1$ to $W_{10}$ are valid, and if so the parity check and the summation check are performed on the data block and if either is successful, all the data words $W_1$ to $W_{10}$ are assumed to be correct.

Figure 6:
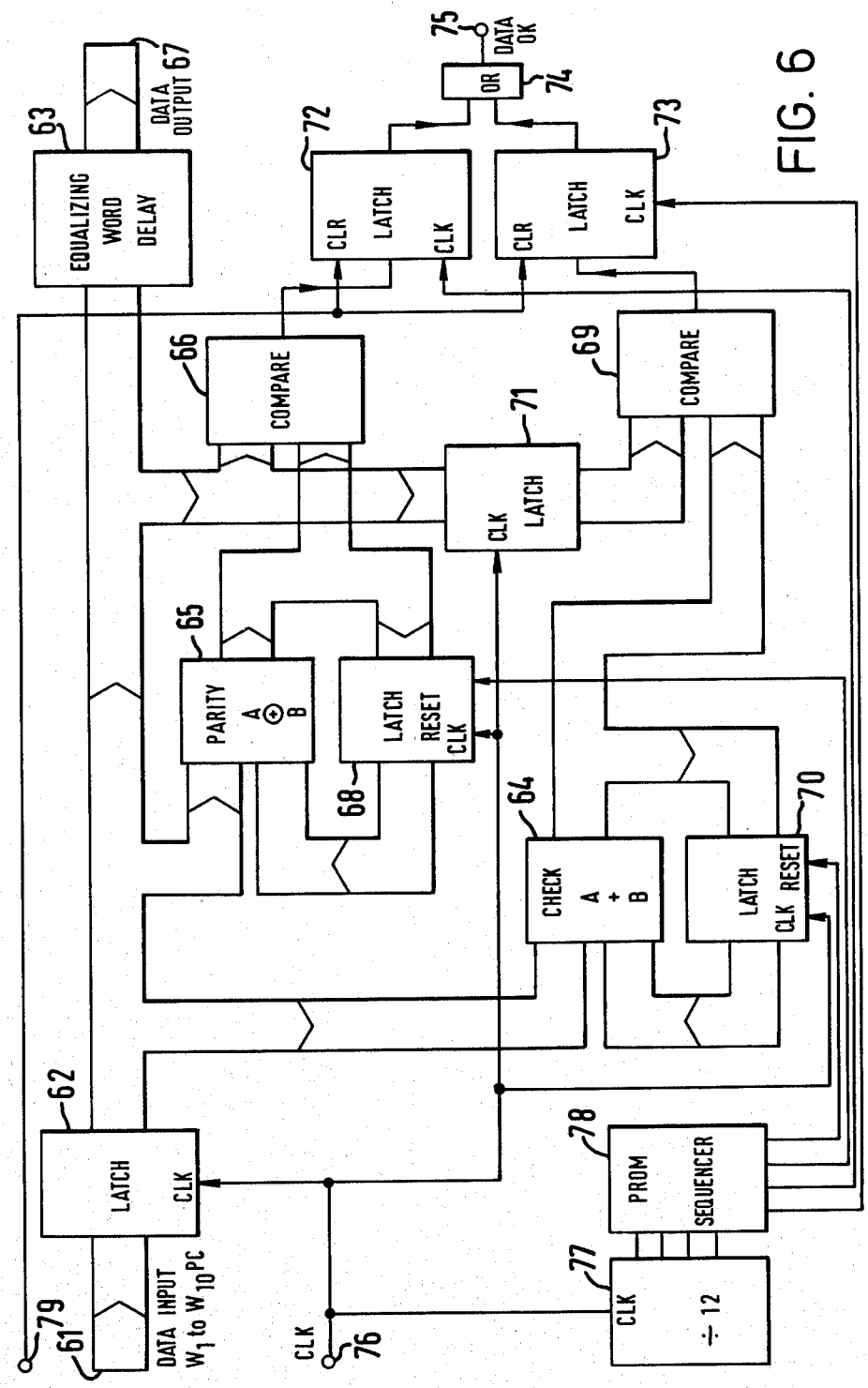
FIG. 6 is a block diagram of a possible addition to the apparatus of FIG. 3.

Referring now to FIG. 6, this shows a block diagram of the additional checking means required and which comprises a data input 61 by way of which the input data comprising the sequence of words $W_1$, $W_2$, $W_3$, $W_4$, $W_5$, $W_6$, $W_7$, $W_8$, $W_9$, $W_{10}$, P, C, $W_1$, $W_2$, . . . is supplied to a latch circuit 62, the output of which is connected to an equalizing word delay circuit 63, to the first input of a check word forming circuit 64, to a first input of a parity word forming circuit 65, and to a first input of a comparator circuit 66. The output of the equalizing word delay circuit 63 is connected to a data output 67. The output of the parity word forming circuit 65 is connected to a second input of the comparator circuit 66 and to the input of a latch circuit 68, the output of which is connected to a second input of the parity word forming circuit 65. The output of the check word forming circuit 64 is connected to one input of a comparator circuit 69, and also to the input of a latch circuit 70, the output of which is connected to a second input of the check word forming circuit 64. The output of the latch circuit 62 is also connected to the input of a latch circuit 71, the output of which is connected to a second input of the comparator circuit 69. The respective outputs of the comparator circuits 66 and 69 are connected to latch circuits 72 and 73 the outputs of which are connected to respective inputs of an OR circuit 74, the output of which is connected to an output terminal 75.

The additional checking means also includes a clock input terminal 76 to which there is supplied a clock pulse signal the repetition rate of which is equal to the incoming word rate. The clock input terminal 76 is connected to clock terminals of the latch circuit 62, 68 and 70 and also to the clock terminal of a frequency divider 77. The frequency divider 77 divides the clock pulse signal by twelve and provides outputs to a programmed read only memory sequencer 78 which has four outputs. Division by twelve brings the repetition rate of the clock pulse signal down to the repetition rate of the blocks of twelve words in the input data or of ten words in the output data. The first to fourth outputs of the sequencer 78 are respectively connected to reset terminals of the latch circuits 68 and 70, and to clock terminals of the latch circuits 72 and 73. Finally, there is an input terminal 79 to which a signal is supplied when the data is valid, that is to say when the validity checker (FIG. 3) has not found an invalid word among the data words $W_1$ to $W_{10}$ of a block. The terminal 79 is connected to respective clear terminals of the latch circuits 72 and 73.

The operation of the additional checking means will now be described.

If the validity checker 9 (FIG. 3) does not detect an invalid word among the data words $W_1$ to $W_{10}$ of a block, then a signal is supplied to the terminal 79 and the latch circuits 72 and 73 are cleared so that no signal is supplied to the OR gate 74. The parity word forming circuit 65 operates to form a parity word as previously described with reference to FIG. 4 and this newly-formed parity word P' is supplied to the comparator circuit 66 for comparison with the parity word P in the incoming data. If the parity words P' and P are identical, a signal is supplied by way of the latch circuit 72 to the OR circuit 74.

The check word forming circuit 64 forms a check word C' generally as described above with reference to FIG. 4, and this newly-formed check word C' is compared with the check word C from the incoming data by the comparator circuit 69. If the check words C' and C are identical, a signal is supplied by way of the latch circuit 77 to the OR circuit 74.

If, therefore, either the latch circuit 72 or the latch circuit 77 supplies a signal to the OR circuit 74, a signal is supplied to the output circuit 75 indicating that the data is valid, or at least that the probability of it being valid is sufficiently high for the data words $W_1$ to $W_{10}$ in the data block not to require concealment.

Although the invention has been described for the case where the further processing to which the digital television signals are subjected is recording and reproduction, it will be realized that it could be some other process, such as passage over a transmission link. Also, although described in relation to errors arising in digital television signals, the invention can of course be applied in relation to errors occuring in other binary signals.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of processing binary data comprising dividing the data into blocks of m words each of n bits, deriving an n-bit parity word each digit of which is a parity digit for the corresponding digits of said m words, deriving an n-bit check word by binary full-addition summing said m words and forming said check word as the n least significant bits of the resulting binary sum, subjecting to further processing said block of words including said parity word and said check word, checking the validity of each of the words, using said parity word and said check word to detect and correct at least some of the errors occurring in said m words during said further processing, and concealing any error which cannot be corrected.

2. A method according to claim 1 wherein n is 8 and prior to said further processing, said words are all converted to respective 10-bit words using the sub-set of 10-bit words consisting of 5 "0" bits and 5 "1" bits, said 10-bit words being re-converted to 8-bit words after said further processing.

3. A method according to claim 1 wherein the natural sequence of said words including the parity words and check words is shuffled prior to said further processing, and the order is restored to said natural sequence after said further processing.

4. A method according to claim 1 wherein said data represents video information of a television signal in digital form.

5. A method according to claim 1 wherein said further processing comprises magnetic recording and reproduction.

6. Apparatus for processing binary data, the apparatus comprising means for dividing the data into blocks of m words each of n bits, means for deriving an n-bit parity word each digit of which is a parity digit for the corresponding digits of said m words, means for deriving an n-bit check word by binary full-addition summing said m words and forming said check word as the n least significant bits of the resulting binary sum, means to subject said block of words including said parity word and said check word to further processing, means for checking the validity of each of the words, means for using said parity word and said check word to detect and correct at least some of the errors occurring in said m words during said further processing, and means for concealing any error which cannot be corrected.

7. Apparatus according to claim 6 wherein n is 8 and wherein said apparatus further comprises means operative prior to said further processing to convert all said words to respective 10-bit words using the sub-set of 10-bit words consisting of 5 "0" bits and 5 "1" bits, and means operative subsequent to said further processing to re-convert said 10-bit words to 8-bit words.

8. Apparatus according to claim 6 further comprising means to shuffle the natural sequence of said words including the parity words and check words prior to said further processing and means to restore the order of said words to said natural sequence after said further processing.

9. Apparatus according to claim 6 wherein said further processing comprises magnetic recording and reproduction, and said apparatus further comprises a video tape recorder for effecting said magnetic recording and reproduction.

10. A method of processing binary data comprising dividing the data into blocks of m data words each of n bits; deriving an n-bit parity word each digit of which is a parity digit for the corresponding digits of said m data words; deriving an n-bit check word by binary summing said m data words and forming said check word as the n least significant bits of the resulting binary sum; shuffling the m data words, the parity word, and the check word of each block so that no two words of the same block are adjacent to one another; transmitting said blocks on a carrier; receiving the transmitted blocks; deshuffling said words to their natural sequence; checking the validity of each of the words; using said parity word and said check word to correct at least one error if less than a predetermined number of erroneous words are present in one such block and if the associated parity word and check word are determined to be valid; and concealing any erroneous words which cannot be corrected; wherein said checking the validity includes checking the validity of said data words, and blocking the concealing of erroneous words if all said data words are determined to be valid.

11. A method of processing binary data comprising dividing the data into blocks of m data words each of n bits, deriving an n-bit parity word each digit of which is a parity digit for the corresponding digits of said m data words, deriving an n-bit check word by binary summing said m data words and forming said check word as the n least significant bits of the resulting binary sum, transforming said n-bit data words, said n-bit parity word, and said n-bit check word into transformed words each of n' bits, wherein n'>n so that the transformed n'-bit words form a subset of all possible n'-bit words, shuffling the m data words, the parity word, and the check word of each block so that no two words of the same block are adjacent to one another; transmitting said blocks on a carrier; receiving the transmitted blocks; deshuffling said words to their natural sequence; checking the validity of each of the deshuffled n'-bit words; retransforming said n'-bit words into respective n-bit words; using said parity word and said check word to correct at least one error if less than a predetermined number of erroneous words are present in one such block and if the associated parity word and check word are determined to be valid; and concealing any erroneous words which cannot be corrected, wherein said checking the validity includes checking whether the N'-bit data words are all valid members of said subset thereof, and blocking said concealing of erroneous words if all said n'-bit data words are determined to be such valid members.

12. A method according to claim 10, wherein n=8, n'=10, and said subset includes those words having 5 "0" bits and 5 "1" bits.

13. Apparatus for processing binary data, comprising means for dividing the data into blocks of m words each of n bits; means for deriving an n-bit parity word each digit of which is a parity digit for corresponding digits of said m words; means for deriving an n-bit check word by binary summing said m words and forming said check word as the n least significant bits of the resulting binary sum; means for converting said n-bit words into n'-bit converted words, wherein n'>n and the converted words form a predetermined subset of all possible n'-bit words; shuffling means for shuffling said words from their natural sequence so that no two words of the same block are adjacent to one another; means for transmitting the blocks on a carrier; means for receiving the transmitted blocks; deshuffling means for restoring said words to their natural sequence; means for checking whether the m n'-bit words of each block are valid members of said subset; reconverting means for transforming the n'-bit words into respective n-bit words; correcting means using said parity word and said check word to correct at least one error if less than a predetermined number of erroneous words are present in one such block and if the associated parity word and check word are determined to be valid and for concealing any erroneous words which cannot be corrected; wherein said means for checking includes means for determining whether said n'-bit data words are all valid members of said subset and means for blocking concealment of erroneous words if all said n'-bit data words are determined to be valid members.

14. Apparatus for processing binary data according to claim 13, wherein said means for blocking concealment includes validity signal input means coupled to said means for checking to receive a data-valid signal when all the m n'-bit data words are determined to be valid members of said subset; means for computing the parity of said m n-bit data words and comparing the same with said parity word to provide a parity error signal; means for computing the sum of said m n-bit data words and comparing said sum with said check word to provide a check error signal; respective latch circuit means having inputs coupled to receive the associated parity and sum error signals, a clock input, a clear input, and an output; sequencer means providing a latch signal to each said clock input; said validity signal input means being coupled to each said clear input; and an OR circuit having inputs respectively coupled to the outputs of said latch means and an output providing a correction-inhibiting signal to said correcting means.

* * * * *